(12) United States Patent
Kubota et al.

(10) Patent No.: US 11,414,054 B2
(45) Date of Patent: Aug. 16, 2022

(54) VEHICLE CLEANER SYSTEM

(71) Applicant: KOITO MANUFACTURING CO., LTD., Tokyo (JP)

(72) Inventors: Akinobu Kubota, Shizuoka (JP); Masaaki Sato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 235 days.

(21) Appl. No.: 16/710,735

(22) Filed: Dec. 11, 2019

(65) Prior Publication Data
US 2020/0189528 A1 Jun. 18, 2020

(30) Foreign Application Priority Data

Dec. 12, 2018 (JP) .............................. JP2018-232465

(51) Int. Cl.
| | |
|---|---|
| *B60S 1/52* | (2006.01) |
| *B08B 5/02* | (2006.01) |
| *B08B 3/02* | (2006.01) |
| *B60S 1/56* | (2006.01) |
| *B60S 1/54* | (2006.01) |
| *F16K 27/02* | (2006.01) |
| *B60S 1/48* | (2006.01) |

(Continued)

(52) U.S. Cl.
CPC .................. *B60S 1/52* (2013.01); *B08B 3/02* (2013.01); *B08B 5/02* (2013.01); *B60S 1/481* (2013.01); *B60S 1/54* (2013.01); *B60S 1/56* (2013.01); *F16K 27/003* (2013.01); *F16K 27/029* (2013.01); *F16K 31/0655* (2013.01)

(58) Field of Classification Search
CPC .... B60S 1/481; B60S 1/52; B60S 1/54; B60S 1/56; B60S 1/606; B08B 3/02; B08B 5/02; F16K 27/003; F16K 27/029; F16K 31/0655
See application file for complete search history.

(56) References Cited

U.S. PATENT DOCUMENTS

| | | | |
|---|---|---|---|
| 6,712,088 B2 * | 3/2004 | Gamou | ................. F16K 15/026 137/341 |
| 2002/0026960 A1 * | 3/2002 | Weldon | .............. F02M 25/0836 137/601.14 |

(Continued)

FOREIGN PATENT DOCUMENTS

JP 2001171491 A 6/2001

*Primary Examiner* — Benjamin L Osterhout
(74) *Attorney, Agent, or Firm* — Osha Bergman Watanabe & Burton LLP

(57) ABSTRACT

An electromagnetic valve includes a solenoid; a sealing portion provided on a movable element; an urging member; a first pipe including a first outlet side end portion; and a second pipe including an inlet side end portion and a second outlet side end portion. The first pipe includes a receiving seat being in close contact with the sealing portion. In a first state where the sealing portion is separated from the receiving seat, a liquid flows to the first outlet side end portion. In a second state where the sealing portion is in close contact with the receiving seat, the liquid flows to the second outlet side end portion and does not flow to the first outlet side end portion, and a pressing force by the urging member and a hydrostatic pressure of the liquid in the merging portion act to press the sealing portion against the receiving seat.

2 Claims, 9 Drawing Sheets

(51) Int. Cl.
   *F16K 27/00*     (2006.01)
   *F16K 31/06*     (2006.01)

(56) References Cited

U.S. PATENT DOCUMENTS

| | | | |
|---|---|---|---|
| 2002/0029812 A1* | 3/2002 | Hotta | F16K 1/443 |
| | | | 137/613 |
| 2002/0088958 A1* | 7/2002 | Weldon | F16K 31/0651 |
| | | | 251/129.21 |
| 2010/0147266 A1* | 6/2010 | Crispen | F02M 59/466 |
| | | | 123/446 |
| 2012/0097875 A1* | 4/2012 | Nanba | F02M 25/0836 |
| | | | 251/129.15 |
| 2013/0092758 A1* | 4/2013 | Tanaka | B60S 1/52 |
| | | | 239/284.1 |
| 2015/0330514 A1* | 11/2015 | Harada | F02M 25/089 |
| | | | 137/484.2 |
| 2019/0061698 A1* | 2/2019 | Mizuno | B08B 5/04 |

\* cited by examiner

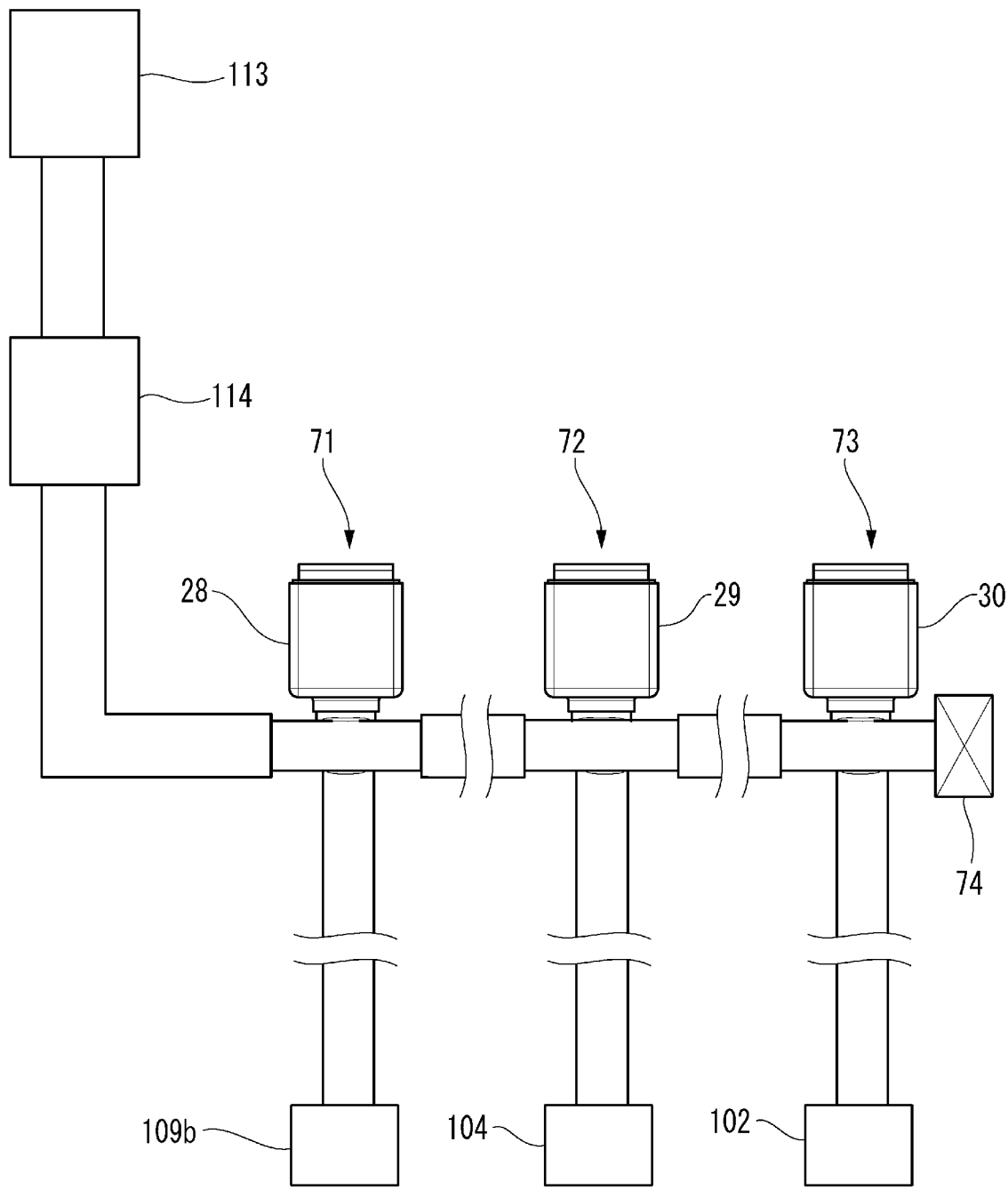

VEHICLE CLEANER SYSTEM

CROSS-REFERENCE TO RELATED APPLICATIONS

This application is based on and claims priority under 35 USC 119 from Japanese Patent Application No. 2018-232465 filed on Dec. 12, 2018.

TECHNICAL FIELD

The present invention relates to a vehicle cleaner system.

BACKGROUND ART

In recent years, cameras have been mounted on vehicles. The camera outputs acquired information to a vehicle ECU which controls the own vehicle. JP-A-2001-171491 or the like discloses a vehicle cleaner capable of cleaning such a camera with a cleaning liquid.

A plurality of cameras and sensors are mounted on a vehicle. It is conceivable to clean the plurality of cameras and sensors with the above-described vehicle cleaner. In this case, it is conceivable to integrate a plurality of vehicle cleaners into a vehicle cleaner system and mount the vehicle cleaner system on the vehicle.

When such a vehicle cleaner system is implemented, it is necessary to transport a fluid from a tank for storing the cleaning liquid to each cleaner unit. When piping is configured to branch from a common pipe to each cleaner unit, a large number of electromagnetic valves are required. Since a plurality of electromagnetic valves are mounted on the vehicle, it is desirable to reduce the power consumption of the respective electromagnetic valves as much as possible.

SUMMARY

Therefore, an aspect of the present invention provides an electromagnetic valve that can be operated with low power consumption, and a vehicle cleaner system including the electromagnetic valve.

An embodiment of the present invention relates to an electromagnetic valve which includes:

a solenoid including a movable element configured to move relative to a stator;

a sealing portion provided on the movable element;

an urging member;

a first pipe including a first outlet side end portion on a downstream thereof; and a second pipe including an inlet side end portion on an upstream thereof and a second outlet side end portion on a downstream thereof, the first pipe includes a receiving seat configured to be in close contact with the sealing portion, a merging portion where the first pipe and the second pipe merge is provided upstream of the receiving seat of the first pipe, the sealing portion is configured to move to a position that is in close contact with the receiving seat and a position that is separated from the receiving seat, the sealing portion is pressed against the receiving seat by the urging member, in a first state where the sealing portion is separated from the receiving seat, a liquid flowing in from the inlet side end portion is allowed to flow to the first outlet side end portion through the merging portion, in a second state where the sealing portion is in close contact with the receiving seat, the liquid flowing in from the inlet side end portion is allowed to flow to the second outlet side end portion through the merging portion, and does not flow to the first outlet side end portion, and in the second state, a pressing force by the urging member and a hydrostatic pressure of the liquid in the merging portion act to press the sealing portion against the receiving seat.

Another embodiment of the present invention relates to a vehicle cleaner system which includes:

an upstream branch portion including the electromagnetic valve according to the above-mentioned embodiment;

a tank connected to the inlet side end portion of the electromagnetic valve of the upstream branch portion and configured to store a cleaning medium;

an upstream cleaner unit connected to the first outlet side end portion of the electromagnetic valve of the upstream branch portion;

a downstream branch portion including the electromagnetic valve according to the above-mentioned embodiment;

a connecting portion connecting the second outlet side end portion of the electromagnetic valve of the upstream branch portion and the inlet side end portion of the electromagnetic valve of the downstream branch portion;

a downstream cleaner unit connected to the first outlet side end portion of the electromagnetic valve of the downstream branch portion; and a blocking portion provided at the second outlet side end portion of the electromagnetic valve of the downstream branch portion and preventing the cleaning medium from the second outlet side end portion of the electromagnetic valve from being discharged to an outside According to the above-mentioned embodiment of the present invention, an electromagnetic valve that can be operated with low power consumption, and a vehicle cleaner system including the electromagnetic valve are provided.

BRIEF DESCRIPTION OF DRAWINGS

FIG. 9 is a schematic diagram showing a state where eighth to tenth electromagnetic valves are connected with respect to a rear pump, a rear camera cleaner, a rear LC, and a rear WW.

DESCRIPTION OF EMBODIMENTS

Figure 1:
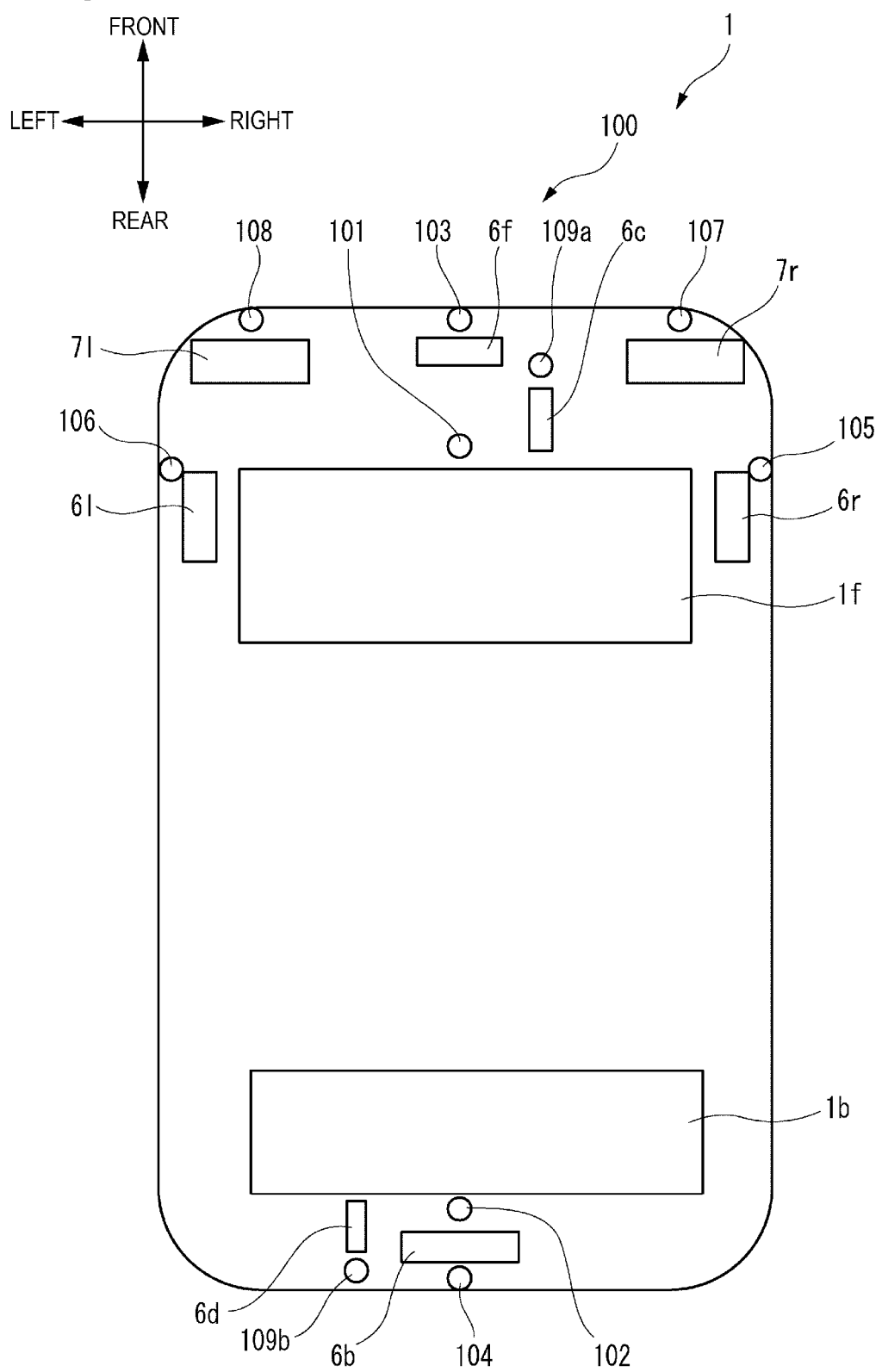
FIG. 1 is a top view of a vehicle on which a cleaner system is mounted.

Hereinafter, a first embodiment of the invention will be described with reference to the drawings. Incidentally, in the description of the embodiment, members having the same reference numerals as those already described are not described to simplify the description. The dimensions of the members shown in the drawings may be different from those of actual members for convenience of description.

In the description of the present embodiment, a "left-right direction", a "front-rear direction" and an "upper-lower direction" are appropriately referred to for convenience of description. These directions are relative directions set for a vehicle 1 shown in FIG. 1. Here, the "upper-lower direction" is a direction including an "upper direction" and a "lower direction". The "front-rear direction" is a direction including a "front direction" and a "rear direction". The "left-right direction" is a direction including a "left direction" and a "right direction".

FIG. 1 is a top view of the vehicle 1 on which a vehicle cleaner system 100 (hereinafter referred to as a cleaner system 100) according to the present embodiment is mounted. The vehicle 1 includes the cleaner system 100. In the present embodiment, the vehicle 1 is an automobile that can travel in an automated driving mode.

Figure 2:
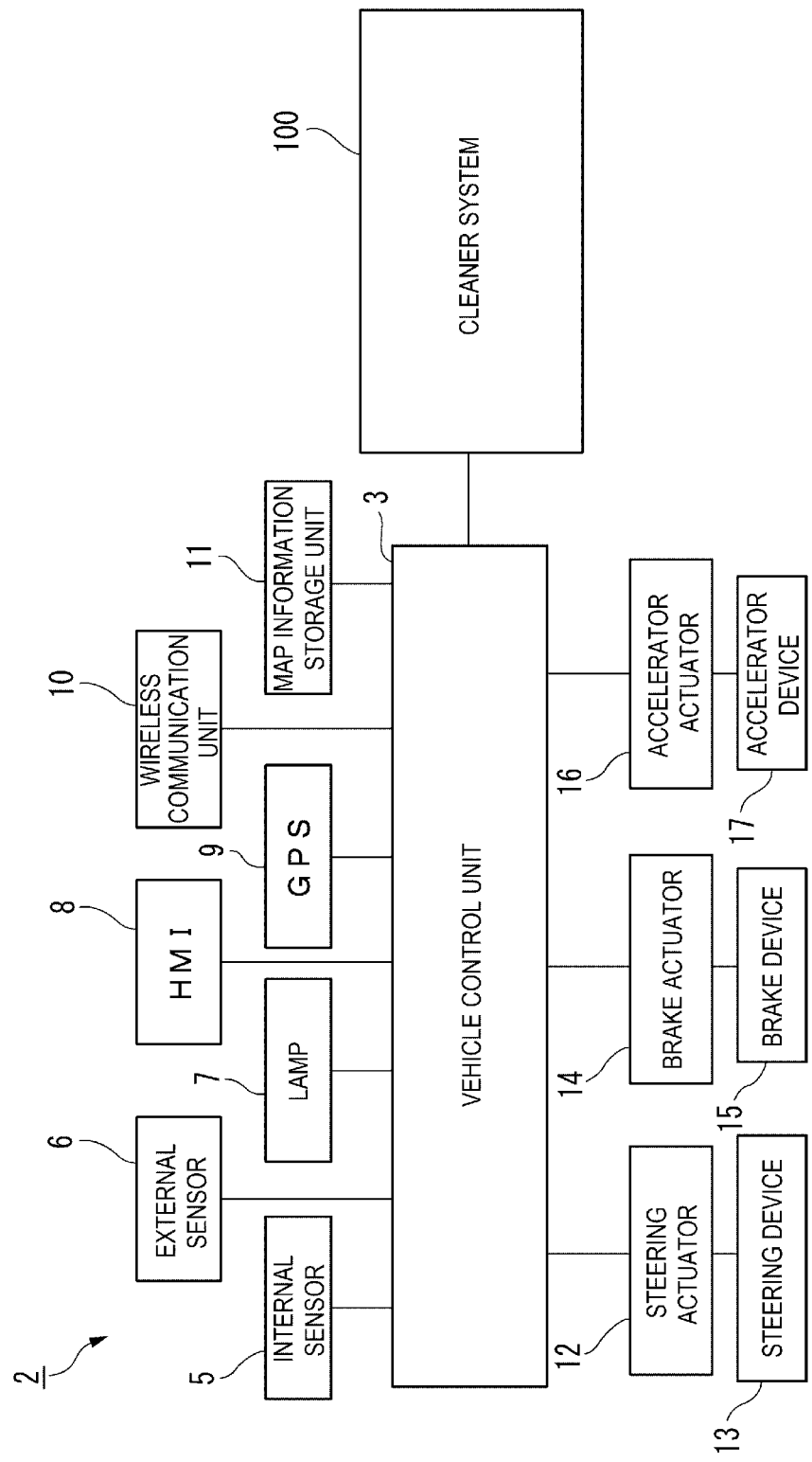
FIG. 2 is a block diagram of a vehicle system.

First, a vehicle system 2 of the vehicle 1 will be described with reference to FIG. 2. FIG. 2 shows a block diagram of the vehicle system 2. As shown in FIG. 2, the vehicle system 2 includes a vehicle control unit 3, an internal sensor 5, an external sensor 6, a lamp 7, a Human Machine Interface (HMI) 8, a Global Positioning System (GPS) 9, a wireless communication unit 10, and a map information storage unit 11. Further, the vehicle system 2 includes a steering actuator 12, a steering device 13, a brake actuator 14, a brake device 15, an accelerator actuator 16, and an accelerator device 17.

The vehicle control unit 3 is configured with an Electronic Control Unit (ECU). The electronic control unit 3 is configured with a processor such as a Central Processing Unit (CPU), a Read Only Memory (ROM) in which various vehicle control programs were stored, and a Random Access Memory (RAM) temporarily storing various vehicle control data. The processor is configured to develop a program selected from the various vehicle control programs stored in the ROM onto the RAM, and execute various processing in cooperation with the RAM. The vehicle control unit 3 is configured to control traveling of the vehicle 1.

The internal sensor 5 is a sensor which can acquire information on the own vehicle. The internal sensor 5 includes at least one of an acceleration sensor, a speed sensor, a wheel speed sensor, a gyro sensor or the like. The internal sensor 5 is configured to acquire own vehicle information including a traveling state of the vehicle 1 and output the information to the vehicle control unit 3.

The external sensor 6 is a sensor which can acquire information outside the own vehicle. The external sensor is, for example, at least one of a camera, radar, LiDAR, or the like. The external camera 6 is configured to acquire information outside the own vehicle including a surrounding environment of the vehicle 1 (other vehicles, pedestrians, road shapes, traffic signs, obstacles, or the like) and output the information to the vehicle control unit 3. Alternatively, the external sensor 6 may include such as a weather sensor which detects a weather condition, an illuminance sensor which detects illuminance of the surrounding environment of the vehicle 1.

For example, the camera includes an imaging element such as a charge-coupled device (CCD) or a complementary MOS (CMOS). The camera is a camera which detects visible light or an infrared camera which detects infrared rays.

The radar is millimeter wave radar, microwave radar, laser radar, or the like.

The LiDAR is an abbreviation for Light Detection and Ranging or Laser Imaging Detection and Ranging. The LiDAR is a sensor which generally emits invisible light forward and acquires information such as a distance to an object, a shape of the object, a material of the object, and a color of the object based on the emitted light and return light.

The lamp 7 is at least one of a headlamp or a position lamp provided at a front portion of the vehicle 1, a rear combination lamp provided at a rear portion of the vehicle 1, a turn signal lamp provided at the front portion or a side portion of the vehicle, and various lamps for informing pedestrians or other vehicle drivers of a situation of the own vehicle.

The HMI 8 is configured with an input unit which receives an input operation from a driver and an output unit which outputs the traveling information or the like to the driver. The input unit includes a steering wheel, an accelerator pedal, a brake pedal, a driving mode changeover switch which switches a driving mode of the vehicle 1, or the like. The output unit is a display which displays various kinds of traveling information.

The GPS 9 is configured to acquire current position information of the vehicle 1 and output the acquired current position information to the vehicle control unit 3. The wireless communication unit 10 is configured to receive traveling information of other vehicles around the vehicle 1 from other vehicles and transmit the traveling information of the vehicle 1 to other vehicles (vehicle-to-vehicle communication). Further, the wireless communication unit 10 is configured to receive infrastructure information from infrastructure equipment such as a traffic light and a sign lamp and transmit the traveling information of the vehicle 1 to the infrastructure equipment (road-to-vehicle communication). The map information storage unit 11 is an external storage device such as a hard disk drive storing map information and is configured to output the map information to the vehicle control unit 3.

When the vehicle 1 travels in an automated driving mode, the vehicle control unit 3 automatically generates at least one of a steering control signal, an accelerator control signal, and a brake control signal based on the traveling state information, the surrounding environment information, the current position information, the map information or the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. Accordingly, the traveling of the vehicle 1 is automatically controlled by the vehicle system 2 in the automated driving mode.

Meanwhile, when the vehicle 1 travels in a manual driving mode, the vehicle control unit 3 generates a steering control signal, an accelerator control signal, and a brake control signal according to a manual operation of the driver with respect to the accelerator pedal, the brake pedal, and the steering wheel. Accordingly, in the manual driving mode, since the steering control signal, the accelerator control signal, and the brake control signal are generated by the manual operation of the driver, the traveling of the vehicle 1 is controlled by the driver.

Next, the driving mode of the vehicle 1 will be described. The driving mode includes the automated driving mode and the manual driving mode. The automated driving mode includes a fully automated driving mode, a high-grade driving assistance mode, and a driving assistance mode. In the fully automated driving mode, the vehicle system 2 automatically performs all traveling controls including a steering control, a brake control, and an accelerator control, and the driver cannot drive the vehicle 1. In the high-grade driving assistance mode, the vehicle system 2 automatically performs all the traveling controls including the steering control, the brake control, and the accelerator control, and the driver does not drive the vehicle 1 although the driver can drive the vehicle 1. In the driving assistance mode, the vehicle system 2 automatically performs a part of the traveling controls including the steering control, the brake control, and the accelerator control, and the driver drives the vehicle 1 under the driving assistance of the vehicle system 2. Meanwhile, in the manual driving mode, the vehicle system 2 does not automatically perform the traveling control, and the driver drives the vehicle 1 without the driving assistance of the vehicle system 2.

The driving mode of the vehicle 1 may be switched by operating the driving mode changeover switch. In this case, the vehicle control unit 3 switches the driving mode of the vehicle 1 among the four driving modes (the fully automated driving mode, the high-grade driving assistance mode, the driving assistance mode, and the manual driving mode) according to the operation of the driver to the driving mode changeover switch. Further, the driving mode of the vehicle 1 may be automatically switched based on information on a traveling permitted section where the traveling of the automated driving vehicle is permitted and a traveling prohibited section where the traveling of the automated driving vehicle is prohibited or information on the outside weather condition. In this case, the vehicle control unit 3 switches the driving mode of the vehicle 1 based on these kinds of information. Further, the driving mode of the vehicle 1 may be automatically switched by using the seating sensor, the face direction sensor, or the like. In this case, the vehicle control unit 3 switches the driving mode of the vehicle 1 based on an output signal from the seating sensor or the face direction sensor.

Returning to FIG. 1, the vehicle 1 includes, as the external sensor 6, a front LiDAR 6*f*, a rear LiDAR 6*b*, a right LiDAR 6*r*, a left LiDAR 6*l*, a front camera 6*c*, and a rear camera 6*d*. The front LiDAR 6*f* is configured to acquire information in front of the vehicle 1. The rear LiDAR 6*b* is configured to acquire information behind the vehicle 1. The right LiDAR 6*r* is configured to acquire information on the right of the vehicle 1. The left LiDAR 6*l* is configured to acquire information on the left of the vehicle 1. The front camera 6*c* is configured to acquire information in front of the vehicle 1. The rear camera 6*d* is configured to acquire information behind the vehicle 1.

In the example shown in FIG. 1, the front LiDAR 6*f* is provided at the front portion of the vehicle 1, the rear LiDAR 6*b* is provided at the rear portion of the vehicle 1, the right LiDAR 6*r* is provided at the right portion of the vehicle 1, and the left LiDAR 6*l* is provided at the left portion of the vehicle 1, but the present invention is not limited to this example. For example, the front LiDAR, the rear LiDAR, the right LiDAR, and the left LiDAR may be collectively arranged on a ceiling portion of the vehicle 1.

The vehicle 1 includes, as the lamp 7, a right headlamp 7*r* and a left headlamp 7*l*. The right headlamp 7*r* is provided at a right-front portion of the vehicle 1, and the left headlamp 7*l* is provided at a left-front portion of the vehicle 1. The right headlamp 7*r* is provided on a right side of the left headlamp 7*l*.

The vehicle 1 includes a front window 1*f* and a rear window 1*b*.

The vehicle 1 includes the cleaner system 100 according to the embodiment of the present invention. The cleaner system 100 is a system which removes foreign matters such as water droplets, mud, and dust attached to an object to be cleaned using a cleaning medium. In the present embodiment, the cleaner system 100 includes a front window washer (hereinafter referred to as front WW) 101, a rear window washer (hereinafter referred to as rear WW) 102, a front LiDAR cleaner (hereinafter referred to as front LC) 103, a rear LiDAR cleaner (hereinafter referred to as rear LC) 104, a right LiDAR cleaner (hereinafter referred to as right LC) 105, a left LiDAR cleaner (hereinafter referred to as left LC) 106, a right headlamp cleaner (hereinafter referred to as right HC) 107, a left headlamp cleaner (hereinafter referred to as left HC) 108, a front camera cleaner 109*a*, and a rear camera cleaner 109*b*. Each of the cleaners 101 to 109*b* includes one or more nozzles, and discharges a cleaning medium such as a cleaning liquid or air from the nozzles toward an object to be cleaned.

The front WW 101 can clean the front window 1*f*. The rear WW 102 can clean the rear window 1*b*. The front LC 103 can clean the front LiDAR 6*f*. The rear LC 104 can clean the rear LiDAR 6*b*. The right LC 105 can clean the right LiDAR 6*r*. The left LC 106 can clean the left LiDAR 6*l*. The right HC 107 can clean the right headlamp 7*r*. The left HC 108 can clean the left headlamp 7*l*. The front camera cleaner 109*a* can clean the front camera 6*c*. The rear camera cleaner 109*b* can clean the rear camera 6*d*. In the following description, the front camera cleaner 109*a* and the rear camera cleaner 109*b* may be collectively referred to as a camera cleaner 109.

Figure 3:
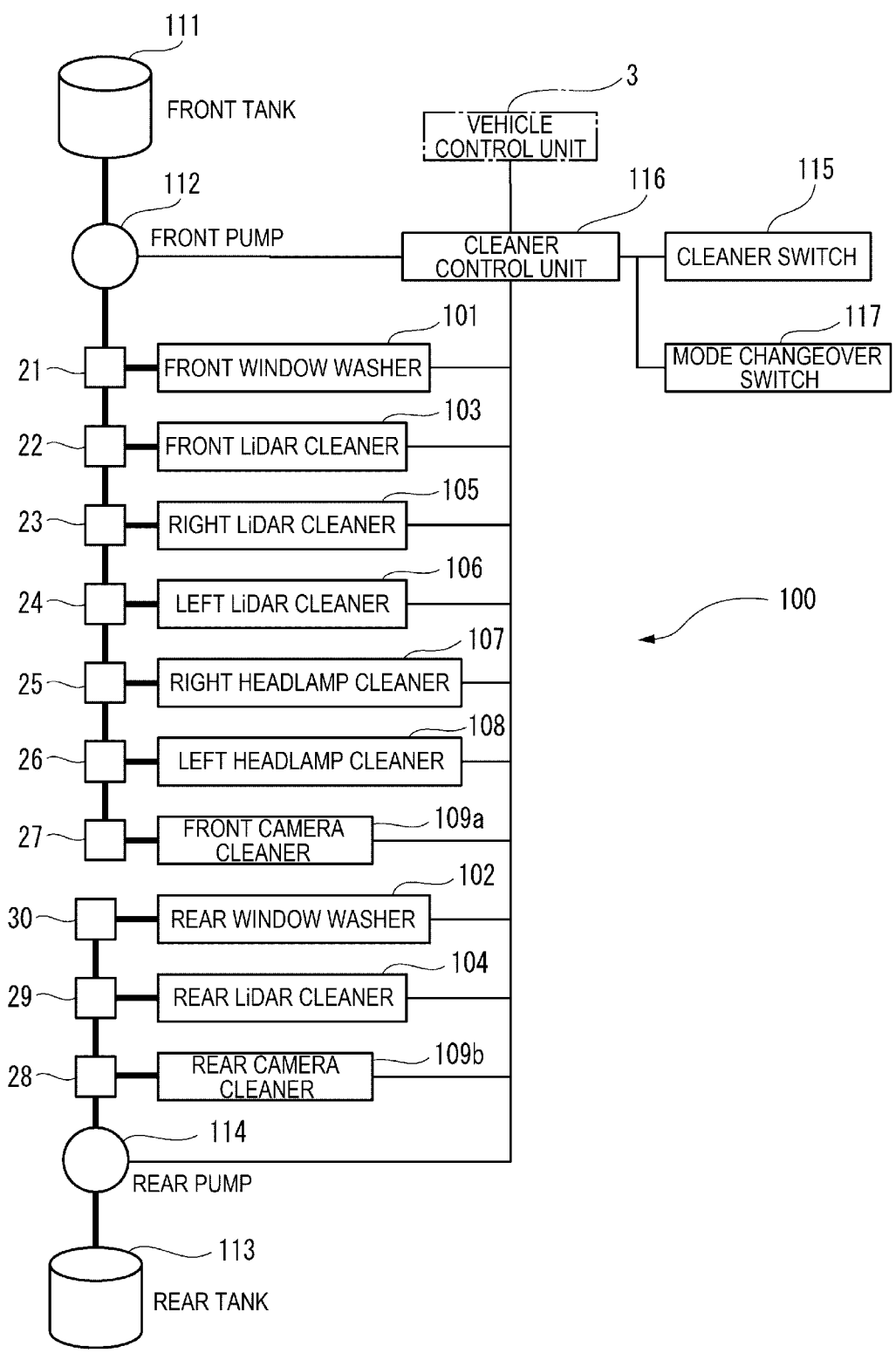
FIG. 3 is a block diagram of a cleaner system.

FIG. 3 is a block diagram of the cleaner system 100. The cleaner system 100 includes a front tank 111, a front pump 112, a rear tank 113, a rear pump 114, and a cleaner control unit 116 in addition to the cleaners 101 to 109*b*.

The front WW 101, the front LC 103, the right LC 105, the left LC 106, the right HC 107, the left HC 108, and the front camera cleaner 109*a* are connected to the front tank 111 via the front pump 112. The front pump 112 sends a cleaning liquid stored in the front tank 111 to the front WW 101, the front LC 103, the right LC 105, the left LC 106, the right HC 107, the left HC 108, and the front camera cleaner 109*a*.

The rear WW 102, the rear LC 104, and the rear camera cleaner 109*b* are connected to the rear tank 113 via the rear pump 114. The rear pump 114 sends a cleaning liquid stored in the rear tank 113 to the rear WW 102, the rear LC 104, and the rear camera cleaner 109*b*.

Each of the cleaners 101 to 109*b* is provided with an actuator which opens the nozzle and discharges the cleaning liquid onto the object to be cleaned. The respective actuators provided in the cleaners 101 to 109*b* are electrically connected to the cleaner control unit 116. The cleaner control unit 116 is also electrically connected to the front pump 112, the rear pump 114, and the vehicle control unit 3.

In the cleaner system 100 according to the first embodiment of the present invention, the cleaner control unit 116 is configured to output signals for operating the sensor cleaners 103 to 106 and 109 to the sensor cleaners 103 to 106 and 109 based on signals output from the vehicle control unit.

As shown in FIG. 3, in the cleaner system 100 according to the present embodiment, a first electromagnetic valve 21 is provided in a pipe connecting the front pump 112 and the front WW 101, a second electromagnetic valve 22 is provided in a pipe connecting the first electromagnetic valve 21 and the front LC 103, a third electromagnetic valve 23 is provided in a pipe connecting the second electromagnetic valve 22 and the right LC 105, a fourth electromagnetic valve 24 is provided in a pipe connecting the third electromagnetic valve 23 and the left LC 106, a fifth electromagnetic valve 25 is provided in a pipe connecting the fourth electromagnetic valve 24 and the right HC 107, a sixth electromagnetic valve 26 is provided in a pipe connecting the fifth electromagnetic valve 25 and the left HC 108, and a seventh electromagnetic valve 27 is provided in a pipe connecting the sixth electromagnetic valve 26 and the front camera cleaner 109a.

An eighth electromagnetic valve 28 is provided in a pipe connecting the rear pump 114 and the rear camera cleaner 109b, a ninth electromagnetic valve 29 is provided in a pipe connecting the eighth electromagnetic valve 28 and the rear LC 104, and a tenth electromagnetic valve 30 is provided in a pipe connecting the ninth electromagnetic valve 29 and the rear WW 102.

Figure 4:
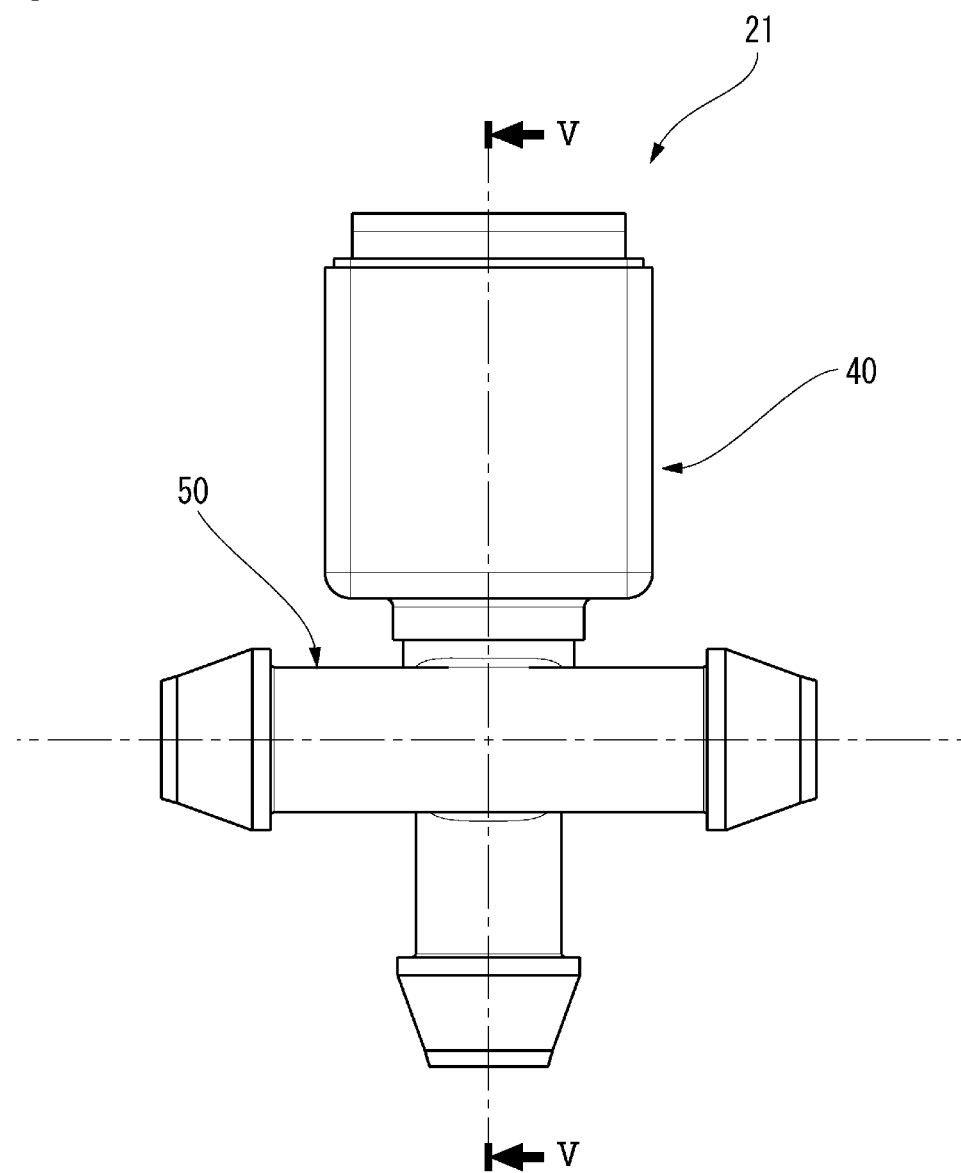
FIG. 4 is a front view of a first electromagnetic valve.

The first electromagnetic valve 21 to the tenth electromagnetic valve 30 all have the same configuration. The first electromagnetic valve 21 will be described with reference to FIGS. 4 to 8. FIG. 4 is a front view of the first electromagnetic valve 21. As shown in FIG. 4, the first electromagnetic valve 21 includes a first pipe 40 comprising a solenoid 60 and a second pipe 50. The first electromagnetic valve 21 can be switched between a first state and a second state. In the first state, the cleaning liquid discharged from the front pump 112 and flowing into the first electromagnetic valve 21 is allowed to be sent to the front WW 101. In the second state, the cleaning liquid discharged from the front pump 112 and flowing into the first electromagnetic valve 21 is not sent to the front WW 101.

Figure 5:
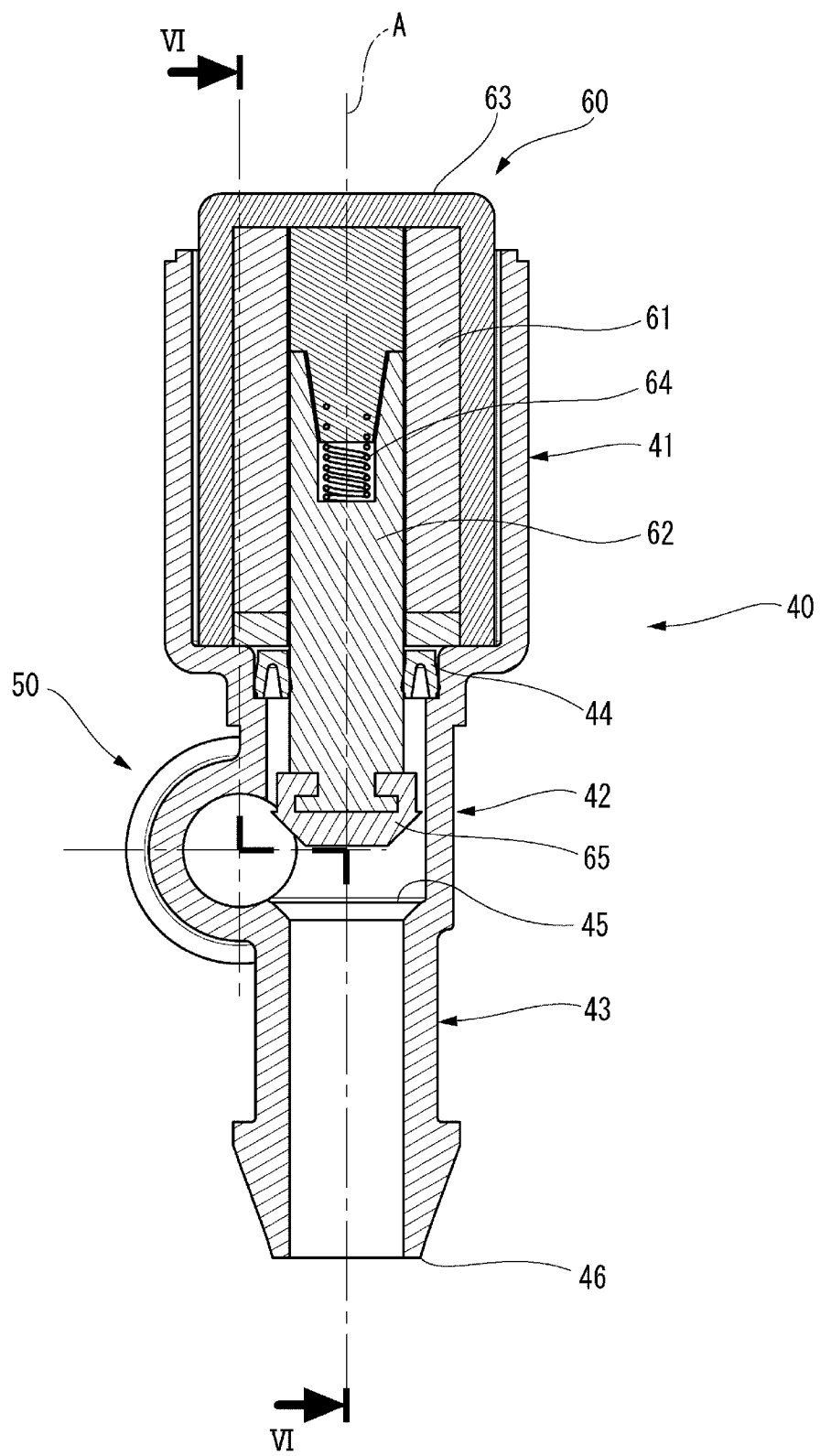
FIG. 5 is a cross-sectional view of the first electromagnetic valve in a first state taken along a line V-V of FIG. 4.
Figure 6:
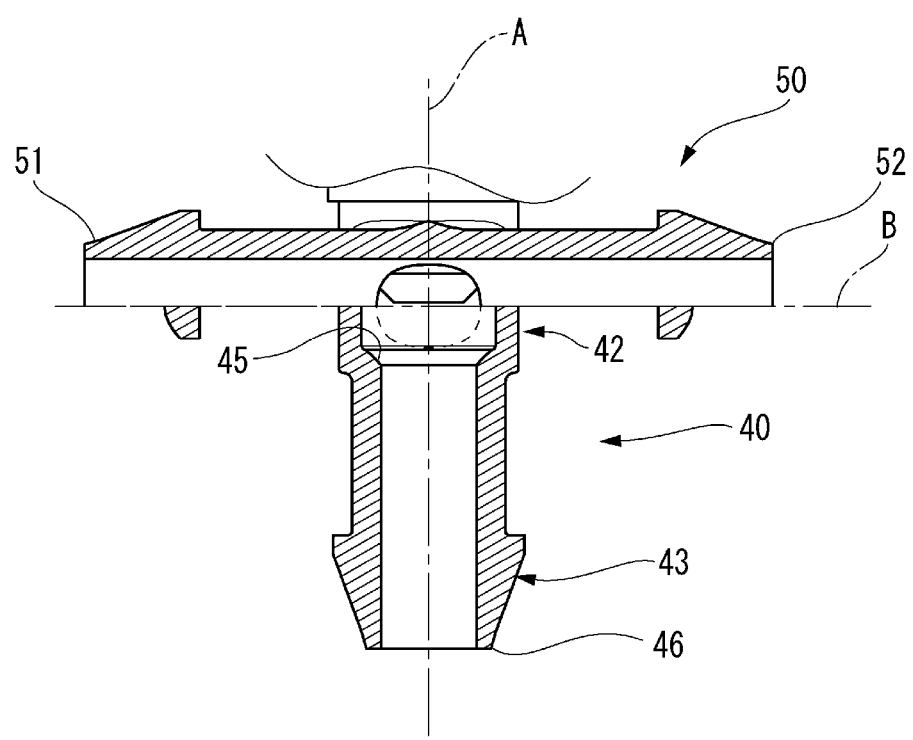
FIG. 6 is a cross-sectional view taken along a line VI-VI in FIG. 5.

FIG. 5 is a cross-sectional view of the electromagnetic valve 21 in the first state taken along a line V-V in FIG. 4. FIG. 6 is a cross-sectional view taken along a line VI-VI in FIG. 5. As shown in FIGS. 5 and 6, the first pipe 40 extends along a first axis A. The cleaning liquid basically flows inside the first pipe 40 from an upper side to a lower side in FIG. 5. The first pipe 40 is configured with three parts having different inner diameters. These three parts are referred to as an accommodating portion 41, an upstream portion 42, and a downstream portion 43 from an upstream toward a downstream. An inner diameter of the accommodating portion 41 is larger than an inner diameter of the upstream portion 42 and an inner diameter of the downstream portion 43. The inner diameter of the upstream portion 42 is smaller than the inner diameter of the accommodating portion 41 and is larger than the inner diameter of the downstream portion 43. The inner diameter of the downstream portion 43 is smaller than the inner diameter of the accommodating portion 41 and the inner diameter of the upstream portion 42.

The solenoid 60 is accommodated in the accommodating portion 41. The solenoid 60 includes a coil 61 (stator), a movable element 62, a yoke 63, and a spring 64. In an uncompressed state, the spring 64 is provided between the yoke 63 and the movable element 62. The movable element 62 can be linearly displaced along the first axis A. A tip end (tip end opposite to the spring 64) of the movable element 62 in the moving direction is provided with a sealing portion 65. The sealing portion 65 is formed of an elastically deformable material such as rubber.

The movable element 62 is provided to cross over the accommodating portion 41 and the upstream portion 42. A seal member 44 is provided near a boundary between the accommodating portion 41 and the upstream portion 42. The seal member 44 is in sliding contact with an outer peripheral surface of the movable element 62. The seal member 44 allows the movable element 62 to move along the movement direction while preventing the cleaning liquid from entering the accommodating portion 41 from the upstream portion 42. That is, the cleaning liquid does not enter the accommodating portion 41.

In the upstream portion 42 (merging portion), the first pipe 40 and the second pipe 50 merge. The cleaning liquid flowing through the second pipe 50 enters the first pipe 40 at the upstream portion 42. Downstream of the merging portion, a receiving seat 45 is provided at the boundary between the upstream portion 42 and the downstream portion 43. An inner diameter of the receiving seat 45 is smaller than an outer diameter of the sealing portion 65.

The downstream portion 43 is connected to the front WW 101 through piping. A downstream end portion of the downstream portion 43 is a first outlet side end portion 46.

The second pipe 50 extends along a second axis B which intersects the first axis A. In the illustrated example, the second pipe 50 extends in a direction orthogonal to the first pipe 40. In the example shown in FIG. 4, the cleaning liquid flows through the second pipe 50 from the left to the right. An inlet side end portion 51 is provided on the upstream (left side) of the second pipe 50. The inlet side end portion 51 is connected to the front pump 112 through piping. A second outlet side end portion 52 is provided on the downstream (right side) of the second pipe 50. The second outlet side end portion 52 is connected to the second electromagnetic valve 22 through piping. The second pipe 50 merges with the first pipe 40 between the inlet side end portion 51 and the second outlet side end portion 52.

Figure 7:
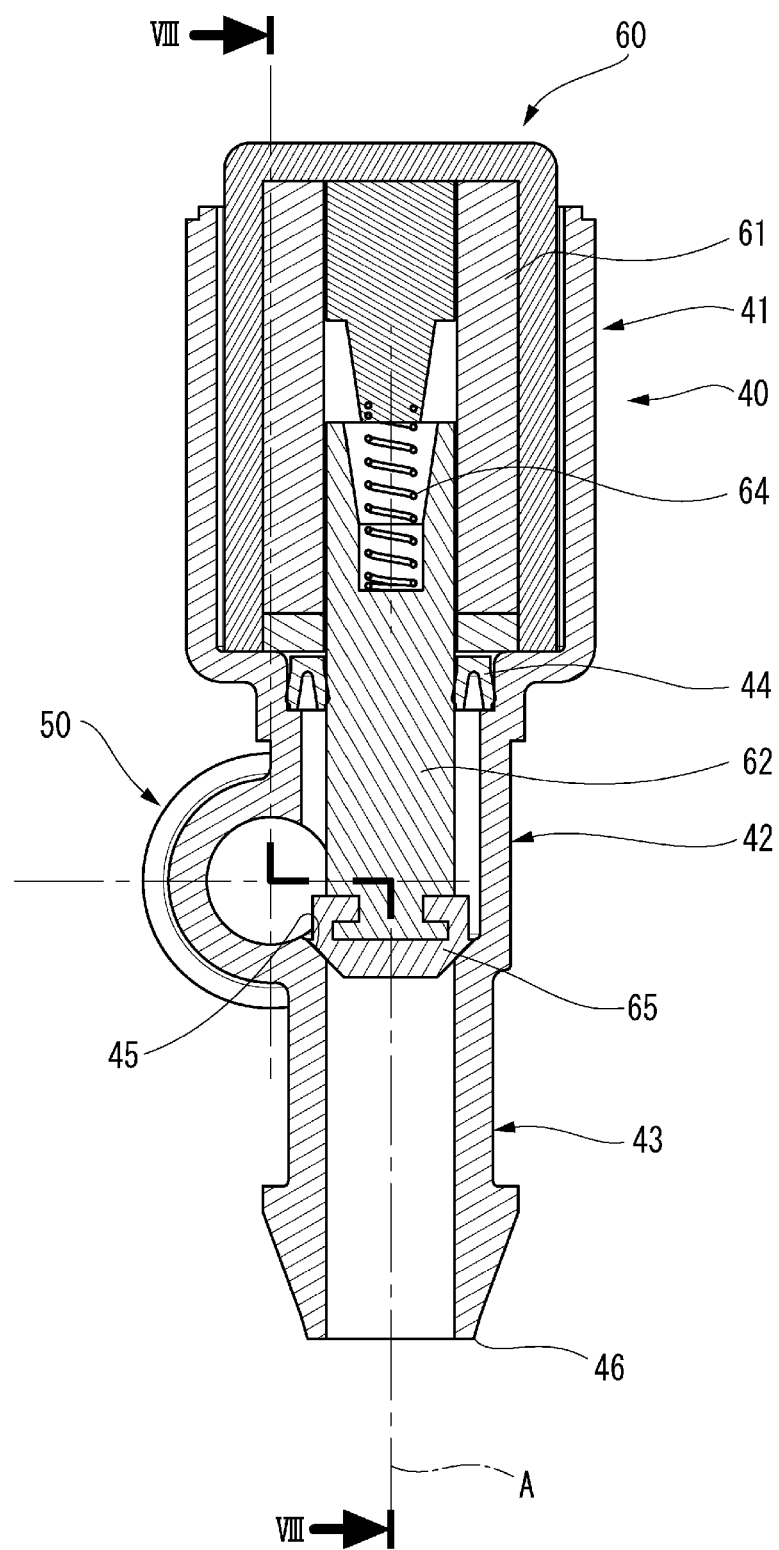
FIG. 7 is a cross-sectional view of the first electromagnetic valve in a second state taken along the line V-V of FIG. 4.
Figure 8:
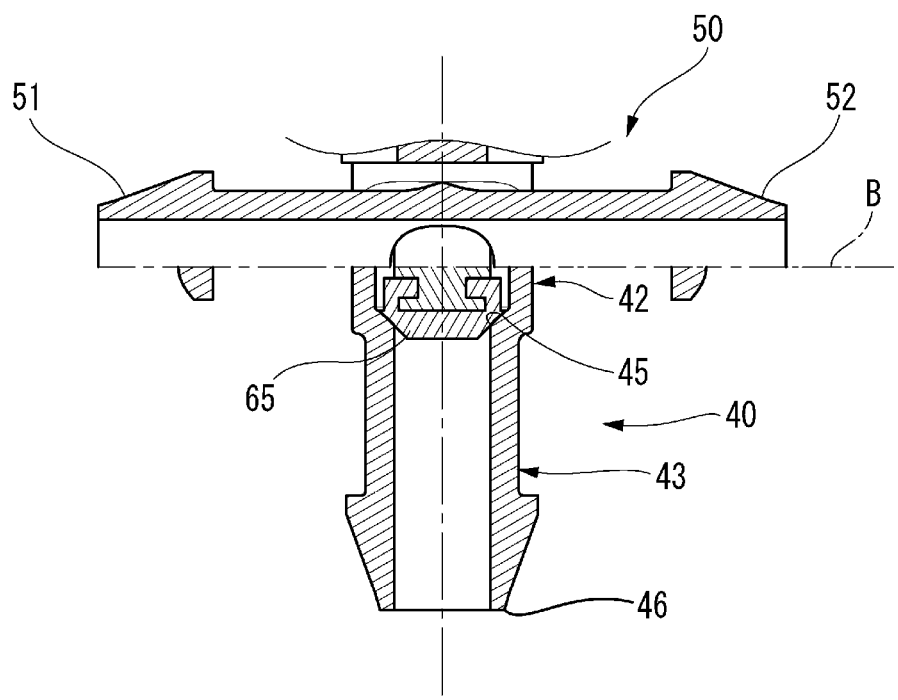
FIG. 8 is a cross-sectional view taken along a line VIII-VIII in FIG. 7.

FIG. 7 is a cross-sectional view of the first electromagnetic valve 21 in the second state taken along the line V-V of FIG. 4. FIG. 8 is a cross-sectional view taken along a line VIII-VIII in FIG. 7. As shown in FIGS. 5 and 7, the sealing portion 65 can move linearly along the first axis A of the first pipe 40. The sealing portion 65 is movable to a position that is in close contact with the receiving seat 45 and a position that is separated from the receiving seat 45. As shown in FIGS. 7 and 8, when the sealing portion 65 is in close contact with the receiving seat 45, the cleaning liquid is prevented from flowing from the upstream portion 42 to the downstream portion 43.

In a normal state where the coil 61 is not energized, the first electromagnetic valve 21 is in a closed state shown in FIGS. 7 and 8. In the closed state, a pressing force acting on the sealing portion 65 by the spring 64 and a hydrostatic pressure of the cleaning liquid stored in the upstream portion 42 acts to press the sealing portion 65 against the receiving seat 45. For example, when the movement of the cleaning liquid is prevented at the second outlet side end portion 52 of the second pipe 50, such as when the second electromagnetic valve 22 is in the closed state, the sealing portion 65 is pressed against the receiving seat 45 due to the hydrostatic pressure of the cleaning liquid accumulated in the upstream portion 42. When the second electromagnetic valve 22 is in an open state, the hydrostatic pressure out of the total pressure of the cleaning liquid flowing through the second pipe 50 also acts to press the sealing portion 65 against the receiving seat 45.

When the coil 61 is energized, a force (an upward force in FIG. 5) is generated in the movable element 62 so as to approach the coil 61. The movable element 62 moves upward in FIG. 5 while compressing the spring 64 against the elastic force of the spring 64. Then, the sealing portion 65 is separated from the receiving seat 45 and the cleaning liquid flows from the second pipe 50 to the first outlet side of the first pipe 40.

Thus, according to the electromagnetic valve of the present embodiment, in the normal state where the coil 61 is not energized, the pressing force acting on the sealing portion 65 by the spring 64 and a hydrostatic pressure of the cleaning liquid stored in the upstream portion 42 acts to press the sealing portion 65 against the receiving seat 45, and the electromagnetic valve is maintained in the closed state. That is, since the hydrostatic pressure acts on the sealing portion 65, it is not necessary to set a large pressing force of the spring 64 which presses the sealing portion 65 against the receiving seat 45 in order to maintain the closed state. Accordingly, it is not necessary to set a large force for attracting the movable element 62 to the coil 61 in order to make the open state. Therefore, there is no need to set a large energization amount to the coil 61. A power supply unit for energizing the coil 61 can be reduced in size, or there is no need to provide a radiator for promoting heat dissipation of the coil 61, and the cleaner system 100 can be made compact.

FIG. 9 is a schematic diagram showing a state where the eighth electromagnetic valve 28 to tenth electromagnetic valve 30 are connected to the rear pump 114, the rear camera cleaner 109b, the rear LC 104, and the rear WW 102. The cleaner system 100 shown in FIG. 9 includes:

an upstream branch portion 71 including the eighth electromagnetic valve 28 having the above-described structure, the rear tank 113 connected to the inlet side end portion 51 of the eighth electromagnetic valve 28 of the upstream branch portion 71 and storing the cleaning liquid, an upstream cleaner unit (rear camera cleaner 109b) connected to the first outlet side end portion 46 of the eighth electromagnetic valve 28 of the upstream branch portion 71, a downstream branch portion 73 including the tenth electromagnetic valve 30 having the above-described structure, a connecting portion 72 connecting the second outlet side end portion 52 of the eighth electromagnetic valve 28 of the upstream branch portion 71 and the inlet side end portion 51 of the tenth electromagnetic valve 30 of the downstream branch portion 73, a downstream cleaner unit (rear WW 102) connected to the first outlet side end portion 46 of the tenth electromagnetic valve 30 of the downstream branch portion 73, and a blocking portion 74 provided at the second outlet side end portion 52 of the tenth electromagnetic valve 30 of the downstream branch portion 73 and preventing the cleaning liquid from the second outlet side end portion 52 of the tenth electromagnetic valve 30 from being discharged to the outside.

In the cleaner system 100 shown in FIG. 9, the connecting portion 72 constitutes an intermediate branch portion including the ninth electromagnetic valve 29. The connecting portion 72 may include a plurality of electromagnetic valves.

The second outlet side end portion 52 of the tenth electromagnetic valve 30 is blocked by the blocking portion 74. Therefore, either the tenth electromagnetic valve 30 is in the open state or in the closed state, the cleaning liquid does not flow out from the second outlet side end portion 52. That is, discharge of the cleaning liquid to the rear WW 102 is permitted or not permitted by switching between the open state and the closed state of the tenth electromagnetic valve 30. Since the second outlet side end portion 52 is always blocked by the blocking portion 74, when the tenth electromagnetic valve 30 is in the closed state, the total pressure (hydrostatic pressure) of the cleaning liquid accumulated in the merging portion acts on the sealing portion 65.

Since the cleaner system 100 according to the present embodiment includes a plurality of electromagnetic valves with low power consumption, the power consumption is low.

As described above, the plurality of electromagnetic valves may be connected such that the first outlet side end portion 46 of the upstream electromagnetic valve is connected to the inlet side end portion 51 of a downstream electromagnetic valve. With such a configuration, there is provided a vehicle cleaner system 100 in which permission of supply of the cleaning liquid to a plurality of cleaners can be controlled individually.

<Various Modification>

Although the embodiment of the present invention has been described, it is needless to say that the technical scope of the present invention should not be interpreted as being limited by the description of the present embodiment. The present embodiment is merely an example, and it is appreciated by those skilled in the art that various embodiments can be changed within the scope of the invention described in the claims. The technical scope of the present invention should be determined based on the scope of the invention described in the claims and the equivalent scope thereof.

In the present embodiment, the driving mode of the vehicle has been described as including the fully automated driving mode, the high-grade driving assistance mode, the driving assistance mode, and the manual driving mode, but the driving mode of the vehicle should not be limited to these four modes. The driving mode of the vehicle may include at least one of these four modes. For example, only one of the driving modes of the vehicle may be executable.

Further, a classification and a display form of the driving mode of the vehicle may be appropriately changed according to regulations or rules related to automated driving in each country. Similarly, the definitions of the "fully automated driving mode", the "high-grade driving assistance mode", and the "driving assistance mode" described in the description of the present embodiment are merely examples, and these definitions may be appropriately changed according to regulations or rules related to automated driving in each country.

In the embodiment described above, although an example in which the cleaner system 100 is mounted on a vehicle which can be automatically driven has been described, the cleaner system 100 may be mounted on a vehicle that cannot be automatically driven.

In the embodiment described above, although an example in which the cleaners 101, 103, 105 to 109a are connected to the front tank 111 and the cleaners 102, 104, 109b are connected to the rear tank 113 has been described, the present invention is not limited thereto.

The cleaners 101 to 109b may be connected to a single tank. The cleaners 101 to 109b may be connected to different tanks.

Alternatively, the cleaners 101 to 109b may be connected to a common tank for each type of object to be cleaned. For example, the cleaners 103 to 106 for cleaning the LiDAR may be connected to a common first tank, and the cleaners 107 and 108 for cleaning the headlamp may be connected to a second tank different from the first tank.

Alternatively, the cleaners 101 to 109b may be connected to a common tank for each arrangement position of the object to be cleaned. For example, the front WW 101, the front LC 103, and the front camera cleaner 109a may be connected to a common front tank, the right LC 105 and the right HC 107 may be connected to a common right tank, the rear WW 102, the rear LC 104, and the rear camera cleaner 109b may be connected to a common rear tank, and the left LC 106 and the left HC 108 may be connected to a common left tank.

In the embodiment described above, as shown in FIG. 3, an example has been described in which the cleaners which clean the front pump, the front WW, the front LC, the right LC, the left LC, the right HC, the left HC, and the front camera cleaner are configured into one unit, and cleaners which clean the rear pump, the rear camera cleaner, the rear LC, and the rear WW are configured into another unit, but the present invention is not limited thereto. The order in which each object to be cleaned is connected to the front pump and the rear pump is not limited to this example. In the embodiment described above, as shown in FIG. 3, an example in which one cleaner is connected downstream of one electromagnetic valve has been described, but the present invention is not limited thereto. A plurality of cleaners may be connected downstream of one electromagnetic valve. A plurality of cleaners for cleaning an object to be cleaned that is often cleaned at the same time may be connected downstream of one electromagnetic valve.

The invention claimed is:

1. An electromagnetic valve, comprising:
   a solenoid including a movable element configured to move relative to a stator;
   a sealing portion provided on the movable element;
   a spring;
   a first pipe including a first outlet side end portion on a downstream thereof; and
   a second pipe including an inlet side end portion on an upstream thereof and a second outlet side end portion on a downstream thereof, wherein
   the first pipe includes a receiving seat configured to be in close contact with the sealing portion,
   a merging portion where the first pipe and the second pipe merge is provided upstream of the receiving seat of the first pipe,
   the sealing portion is configured to move to a position that is in close contact with the receiving seat and a position that is separated from the receiving seat,
   the sealing portion is pressed against the receiving seat by the spring,
   in a first state where the sealing portion is separated from the receiving seat, a liquid flowing in from the inlet side end portion is allowed to flow to the first outlet side end portion through the merging portion,
   in a second state where the sealing portion is in close contact with the receiving seat, the liquid flowing in from the inlet side end portion is allowed to flow to the second outlet side end portion through the merging portion, and does not flow to the first outlet side end portion, and
   in the second state, a pressing force by the spring and a hydrostatic pressure of the liquid in the merging portion act to press the sealing portion against the receiving seat.

2. A vehicle cleaner system, comprising:
   an upstream branch portion including the electromagnetic valve according to claim 1;
   a tank connected to the inlet side end portion of the electromagnetic valve of the upstream branch portion and configured to store a cleaning medium;
   an upstream cleaner unit connected to the first outlet side end portion of the electromagnetic valve of the upstream branch portion;
   a downstream branch portion including the electromagnetic valve according to claim 1;
   a connecting portion connecting the second outlet side end portion of the electromagnetic valve of the upstream branch portion and the inlet side end portion of the electromagnetic valve of the downstream branch portion;
   a downstream cleaner unit connected to the first outlet side end portion of the electromagnetic valve of the downstream branch portion; and
   a blocking portion provided at the second outlet side end portion of the electromagnetic valve of the downstream branch portion and preventing the cleaning medium from the second outlet side end portion of the electromagnetic valve of the downstream branch portion from being discharged to an outside.

* * * * *